May 28, 1957 L. P. THOMAS 2,794,067

KEYED AUTOMATIC GAIN CONTROL CIRCUIT COMPENSATED FOR KEYING PULSE AMPLITUDE VARIATION

Filed Jan. 30, 1952

INVENTOR
Lucius P. Thomas
BY
[signature]
ATTORNEY

United States Patent Office 2,794,067
Patented May 28, 1957

2,794,067

KEYED AUTOMATIC GAIN CONTROL CIRCUIT COMPENSATED FOR KEYING PULSE AMPLITUDE VARIATION

Lucius P. Thomas, Collingswood, N. J., assignor to Radio Corporation of America, a corporation of Delaware Application January 30, 1952, Serial No. 268,940

2 Claims. (Cl. 178—7.5)

Figures 1, 2:
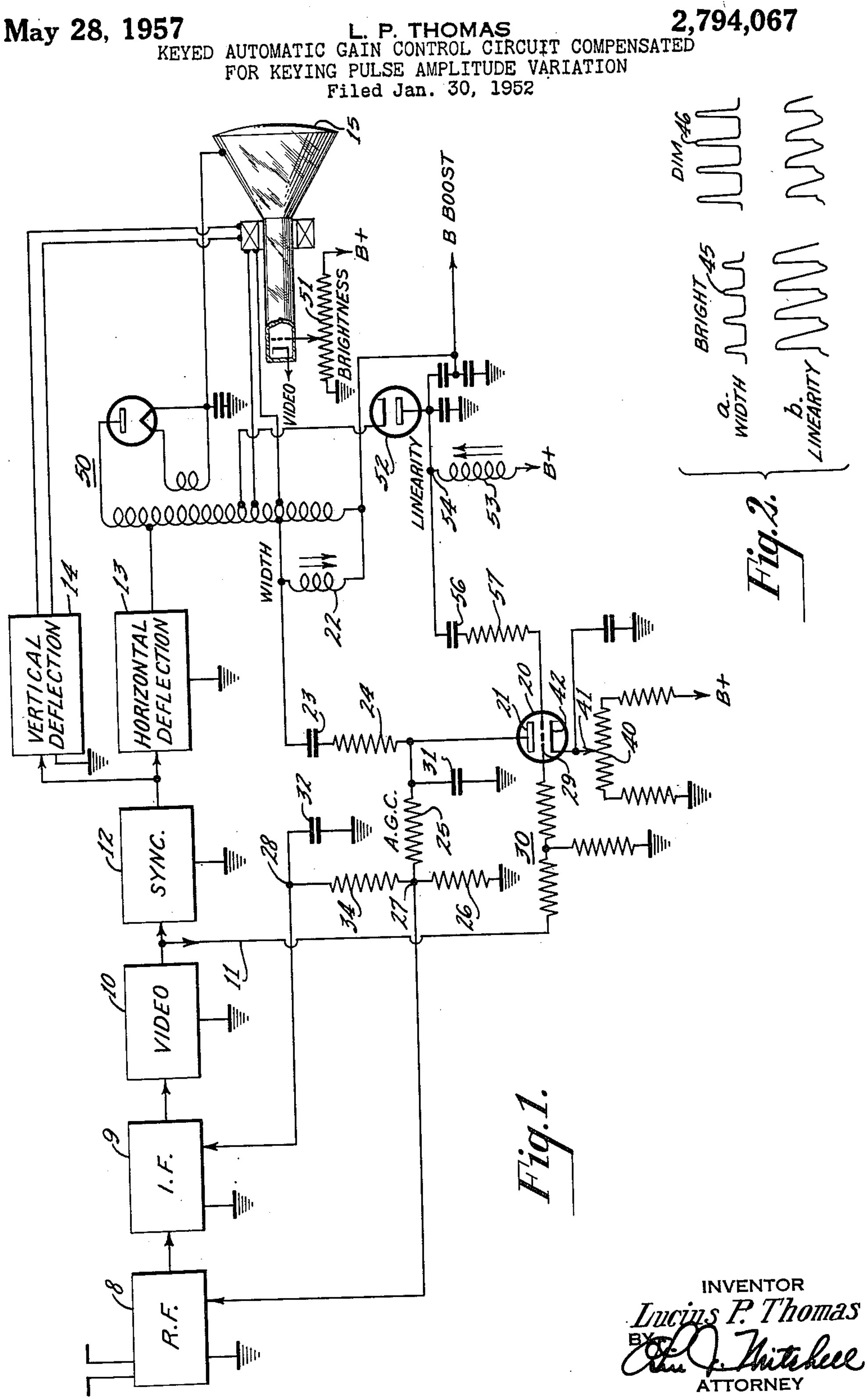

This invention relates to automatic gain control circuits and in particular it relates to gated automatic gain control circuits which are most extensively used in television receivers.

Gated automatic gain control circuits have become widely used because of their excellent noise immunity and because a relatively fast time constant can be used therewith to overcome fading due to airplane flutter and the like. In general gating pulses for such circuits are derived from the horizontal deflection circuits of television receivers and are applied to the anode circuit of the AGC amplifier. When the kinescope brightness control is changed, the load upon the deflection circuit varies and the gating pulses are of different amplitude, width or phase. This causes a change in the control voltage with a change in the brightness control setting.

It is therefore an object of the present invention to provide a gated automatic gain control circuit for television receivers in which the output level does not change with the variations in load upon the horizontal deflection circuit.

It is a general object of the present invention to provide improved automatic gain control circuits.

Another object of the invention is to provide a gated control circuit having an output level which does not vary with loading of the gating pulse supply circuit.

Further objects and advantages of the invention will be made apparent to those skilled in the art from the following discussion of the invention and its mode of operation. The invention may be more readily understood when the detailed description is considered in connection with the accompanying drawings in which:

Figure 1 is a combined block and schematic circuit diagram of a television receiver embodying the invention; and Figure 2 is a waveform diagram chart explaining operational features of one embodiment of the invention.

Those circuits which are of themselves entirely conventional, and whose details form no part of the present invention are shown in block diagram in order that the nature of the invention may not be obscured. Thus in Figure 1 suitable radio frequency, intermediate frequency and video frequency amplifiers 8, 9 and 10 are connected to provide video signals at the AGC input lead 11 and the synchronizing circuit 12. Synchronizing pulses are applied to the horizontal and vertical deflection circuits 13 and 14 from the synchronizing circuit 12 to initiate scanning of the electron beam in the kinescope 15 in synchronism with the scanning of the pickup tube in the transmitter.

In accordance with the illustrated embodiment of the present invention an automatic gain control amplifier stage is provided including the triode amplifier tube 20. The control stage operates as a gated amplifier because the anode potential consists of positive pulses applied to the anode 21 from the horizontal deflection circuit. The gating pulse is derived in the illustrated embodiment from the top of the width control inductance 22 by means of an isolating capacitor 23 and resistor 24.

Positive pulses thus arriving at the anode 21 cause current flow through the anode resistors 25 and 26 thereby affording a negative potential at the AGC output terminals 27 and 28. By providing a suitable video signal at the control grid 29 of tube 20 by means of the resistance network 30 connected to a video voltage source such as the video amplifier circuit 10 by way of the AGC input lead 11, the output current pulse amplitude is made proportional to the peak or synchronizing pulse amplitude of the incoming video signal. Integration of the peak voltages and the plate pulses by the usual AGC output filter networks including capacitors 31 and 32 and resistors 25, 26 and 34 therefore provides at the AGC output terminals 27 and 28 the proper automatic gain control potentials for the radio frequency and intermediate frequency amplifiers 8 and 9 respectively. In the cathode circuit of the tube 20 is an automatic gain control threshold device 40 comprising a variable positive bias. This bias is afforded by a potentiometer circuit connected between a positive potential terminal and ground with the variable tap 41 connected to the cathode 42. The circuit thus far described is the usual gated or pulsed type AGC circuit.

The deflection output circuit 50 is of the conventional reaction scanning type which produces a cyclically recurrent sawtooth deflection waveform for the image reproducing apparatus (kinescope) 15. The sawtooth deflection waveform comprises a trace portion followed by a retrace portion. The trace portion is defined in part by power derived from the horizontal deflection circuit 13, and also in part by electrical damping of reactive voltage appearing across the inductance of the output circuit 50. This damping is accomplished by the diode 52 in accordance with well known practice. In such a circuit the gating pulses derived from the horizontal deflection output circuit 50 corresponding in time to the retrace portion of the deflection waveform have an amplitude dependent upon whatever electrical loading is imposed on the deflection output circuit. Since the kinescope accelerating potential is generally derived from the deflection output circuit 50, the kinescope beam current affords variable loading thereof. Thus as shown in Figure 2*a* when a bright picture is provided by an appropriate setting of the brightness control 51, more beam current is drawn by the kinescope 15, thereby loading the deflection output circuit 50 so that the anode pulses applied to the AGC tube 20 are of small amplitude 45. However, should the load be decreased on the deflection output circuit 50 by a dimmer picture requiring less kinescope beam current the pulses are increased in amplitude as at 46. Since the output AGC level is a function of the AGC amplifier tube anode voltage, particularly when a triode is used, it is therefore readily seen that a variation of load due to brightness control setting variation will change the automatic gain control level.

In accordance with the present invention, therefore, this undesirable characteristic is corrected by circuit means comprising a network connected to a second position in the deflection circuit for producing pulses which increase in amplitude and/or width as the kinescope brightness increases. These pulses therefore may be used in the AGC amplifier circuit to compensate for changes in the automatic gain control level caused by changes in the brightness control setting.

It has been found that when a damping tube 52 and a linearity control winding 53 are serially connected in the deflection output circuit 50, the pulses at the linearity control winding terminal 54 have the proper characteristics for use in accordance with one embodiment of the present invention. The nature of the pulses are illustrated in Figure 2*b*. In general the pulses derived from the linearity winding are broader than the corresponding pulses derived from the width control winding as shown in Figure 2*a*. This is desirable since the problems of phasing the two voltages during the gating period are thereby minimized.

With a bright picture the linearity pulses are of greater amplitude than with a dim picture. This is attributable to the increase in the magnitude of the peak current flowing through the linearity winding inductor 53 upon the increased electrical loading of the deflection circuit occurring as a result of increased beam current in the kinescope 15. Although the magnitude of this change may be less than the magnitude of the change of the width pulses, the amplification of the gain control tube 20 may be utilized to fully compensate for any changes in level control settings. Thus circuit connections are made between the linearity control winding 53 and the input electrode 29 of the control tube 20, including the isolating capacitor 56 and resistor 57. It is therefore seen that when the proper amplitude ratios of control electrode and anode pulses are selected by one skilled in the art to suit the particular automatic gain control circuit used that the gain control level will be independent of the settings of the brightness control 51. Accordingly improved operation of automatic gain control circuit is provided in accordance with the teachings of the present invention.

Since particular circuit values vary with the use of different tubes and deflection circuits and their determination lies within the realm of those skilled in the art in view of the teachings of the present invention it is clear that certain modifications may be made which do not depart from the spirit and scope of the invention. Those features believed descriptive of the nature of the invention are therefore defined in the appended claims.

What is claimed is:

1. In a television receiver, the combination of: an image reproducing apparatus requiring connection to a source of high direct current potential, the high direct current potential load current demanded by said image reproducing apparatus being a function of the brightness of the television image reproduced by said image reproducing apparatus; a source of television signals; means operatively coupling said signal source to said image reproducing apparatus; a television reaction scanning deflection circuit operatively coupled with said signal source to produce a cyclic deflection waveform for said image reproducing apparatus, said deflection waveform being substantially sawtooth in nature and comprising a trace portion and a retrace portion, said deflection circuit comprising a first and a second electrical section coupled with one another by means of a unilaterally conductive circuit path means, said first section including impedance means across which appears a pulse corresponding in time to said retrace portion of said deflection waveform, the amplitude of said pulse being inversely proportional to the degree of conditional electrical loading imposed on said deflection circuit, said second section including impedance means across which appears a signal waveform whose magnitude increases with said conditional loading; rectifying means electrically coupled with said deflection circuit to develop a high direct current potential operatively applied to said image reproducing apparatus such that image brightness changes impose a varying load on said deflection circuit; an automatic gain control circuit operatively included in said receiver and having a first and a second voltage responsive terminal the potentials of which each define the value of automatic gain control potential developed by said gain control circuit, the first of said terminals being designated to receive a pulse waveform corresponding to the pulse appearing across said first section impedance means; means operatively coupling said first section impedance means to said first voltage responsive terminal to deliver to said terminal said pulses appearing across said first section impedance such that variations in reproduced image brightness tend to produce unwanted changes in the magnitude of developed automatic gain control potential; and means operatively coupling said second section impedance means to said second voltage responsive terminal so as to operatively apply at least a portion of the signal appearing across said second section impedance to said second voltage responsive terminal in an electrical sense tending to reduce said unwanted variations in said automatic gain control potential.

2. In a television receiver, the combination of: an image reproducing apparatus requiring connection to a source of high direct current potential, the load current demanded from said source being a function of the brightness of the television image reproduced by said image reproducing apparatus; a source of television signals; means operatively coupling said signal source to said image reproducing apparatus; a television reaction scanning deflection circuit including a first inductor across which is developed a deflection waveform having a trace and a retrace portion, said deflection circuit also including a linearity control inductor coupled with said first inductor by means of a diode such that any increase in electrical loading imposed across said first inductor reduces the amplitude of signal appearing thereacross while increasing the amplitude of signal appearing across said linearity control inductor, said first inductor having also developed across it a pulse signal corresponding to the retrace portion of the deflection waveform; an automatic gain control circuit operatively included in said receiver and having a first and second voltage responsive means each having a respective terminal the potentials of which each define in part the magnitude of automatic gain control voltage developed by said automatic gain control circuit, the effective electrical sensitivity of said second voltage responsive means being substantially greater than said first voltage responsive means; means operatively coupling said first inductor to the terminal of said first voltage responsive means for operatively applying said pulse signal thereto; rectifying means electrically coupled with said first inductor for rectifying said pulse signal to produce a high direct current potential for said image reproducing means; means operatively coupling said image reproducing means to said rectifying means such that changes in image brightness produces unwanted changes in the amplitude of pulse signals applied to said first voltage responsive means, this in turn producing unwanted changes in the magnitude of automatic gain control potential developed by said automatic gain control circuit; and means operatively applying at least a portion of the electrical signal appearing across said linearity control inductor to the terminal of said second voltage responsive means in an electrical sense opposing said unwanted changes in developed automatic gain control potential.

References Cited in the file of this patent

"Rider's Television Manual, vol. 8, General Electric TV, pages 8–16, November 26, 1951.

"RCA Review," September 1948, vol. IX, #3, pages 392, 393.